Dec. 20, 1960 C. E. JOHNSON, JR 2,965,044
POWER SUPPLIES FOR MINIATURE ELECTRIC RAILWAYS
Filed May 3, 1956
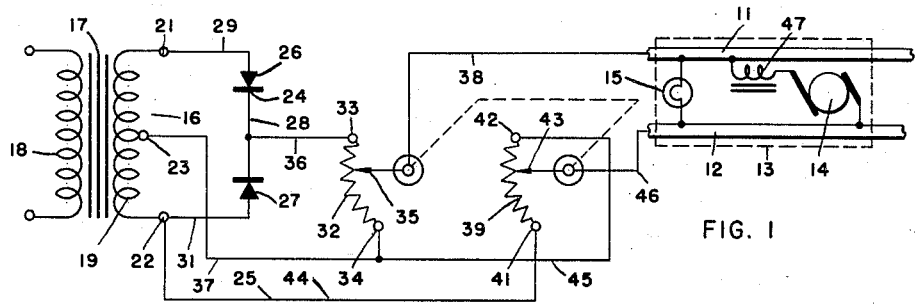
INVENTOR
CLARK E. JOHNSON JR.
Caswell + Lagaard
ATTORNEYS

United States Patent Office 2,965,044
Patented Dec. 20, 1960

2,965,044

POWER SUPPLIES FOR MINIATURE ELECTRIC RAILWAYS

Clark E. Johnson, Jr., White Bear Lake, Minn.
(1782 Knox Ave. S., Minneapolis 5, Minn.)

Filed May 3, 1956, Ser. No. 582,365

14 Claims. (Cl. 104—150)

The herein disclosed invention relates to power supplies for miniature electric railways and has for an object to provide a power supply which may be varied at the source to control the speed of the train and which will deliver a suitable voltage for lighting the lamps on the train, both when the motor is running and when it is stopped.

Another object of the invention resides in providing a power supply particularly adapted for use with an electric railway using direct current.

An object of the invention resides in providing a power supply utilizing both dircet current for operating the train motors, and a combination of the direct current and alternating current for lighting the lights and in providing a variable voltage control adapted to increase the alternating current voltage as the direct current is decreased and vice versa.

A feature of the invention resides in deriving both of the voltages from a single transformer.

An object of the invention resides in providing two variable resistors connected to the power supply and adapted to vary the voltages delivered and to operate said resistors so as to reduce one voltage when the other voltage is increased and vice versa.

Another object of the invention resides in providing a power supply in which the polarity of the direct current may be reversed without switching.

A still further object of the invention resides in providing a power supply in which a single variable resistor may be used to procure the two voltages.

Other objects of the invention reside in the novel combination and arrangement of parts and in the details of construction hereinafter illustrated and/or described.

In the drawings:

Fig. 1 is a diagrammatic view of a power supply illustrating an embodiment of the invention.

Fig. 2 is a diagrammatic view of a modification of the power supply illustrated in Fig. 1.

Fig. 3 is a diagrammatic view of still another form of the invention.

Fig. 4 is a diagrammatic view of another modification of the invention.

For the purpose of illustrating the invention, the tracks of a minature electric railway have been illustrated, and the rails thereof designated by the reference numerals 11 and 12. A locomotive has been designated in diagrammatic form by the reference numeral 13 and the motor 14 has been shown as connected across the rails. In similar manner, a light 15 of the train has been illustrated as connected across the rails.

The power supply used with the invention is indicated by the reference numeral 16 and includes a power transformer 17 having a primary 18 and a secondary 19. The secondary 19 has end terminals 21 and 22 and a center tap 23. The primary 18 may be connected to a suitable source of alternating current in the customary manner. The power supply comprises a unidirectional current power unit 24 and an alternating power unit 25.

The power unit 24 includes two rectifiers 26 and 27, the positive elements of which are connected together by means of a conductor 28. The negative element of the rectifier 26 is connected by a conductor 29 to the end terminal 21 of the secondary 19. The negative element of the rectifier 27 is connected by means of a conductor 31 to the end terminal 22 of secondary 19. In addition to the rectifiers 26 and 27, a variable resistor 32 is employed, which is connected in the circuit of the direct current power unit 24. This resistor has end terminals 33 and 34 and a movable contact 35. Terminal 33 is connected by means of a conductor 36 to the conductor 28 while terminal 34 is connected by means of a conductor 37 to the center tap 23 of secondary 19. The movable contact 35 is connected by means of a conductor 38 to the rail 11.

The alternating current power unit 25 includes a variable resistor 39. This resistor has end terminals 41 and 42 and a movable contact 43. The terminal 41 is connected by means of a conductor 44 with the end terminal 22 of the secondary 19. The end terminal 42 of this resistor is connected by means of a conductor 45 to the conductor 37 and which in turn is connected to the center tap 23 of said secondary. Movable contact 43 is connected by means of a conductor 46 to the rail 12.

The motor 14 has connected in series with it a choke 47 while the lamp 15 is directly connected across the rails. The two movable contacts 35 and 43 of the resistors 32 and 39 are connected together and simultaneously moved by any convenient construction.

The operation of the invention is as follows: When the contacts 35 and 43 are at the lower ends of the resistors 32 and 39, no unidirectional current flows to the motor since contact 35 is now connected to the center tap 23 and contact 43 is connected to the lower end of resistor 39. At such position, full alternating current flows, the rails being directly connected across terminal 22 and the center tap 23 of secondary 19. When, however, the contacts are moved to the upper ends of the resistors 32 and 39, contact 43 is directly connected to the conductor 45 and to the center tap of the secondary 19 of transformer 17. At the same time, contact 35 is connected to the upper end of the resistor 32. Full unidirectional current now flows and no alternating current. It will readily be comprehended as the unidirectional current is increased the alternating current component is decreased and vice versa. Since the choke 47 prevents any alternating current from flowing through the motor 14, the current through the motor may be varied from almost zero up to maximum by merely rotating the knob controlling the contacts 35 and 43. However, since both alternating current and unidirectional current, can flow through the light 15, the combined alternating and direct current energizes the light. since, as the direct current increases, the alternating current will decrease and vice versa, suitable voltage is supplied to the lamp regardless of the voltage at the motor 14. Choke 47 has a low resistance and hence when unidirectional current is flowing most of the applied voltage appears across motor 14. Conversely, choke 14 has a high inductance compared to motor 14 and therefore when alternating current is applied most of the voltage appears across choke 47. Thus motor 14 receives only the unidirectional component of the applied voltage across the rails 11 and 12.

In Fig. 2, a modification of the invention has been shown, which utilizes a single variable resistor instead of the two variable resistors disclosed in Fig. 1. Due to the similarity of certain of the parts in this form of the invention with those disclosed in Fig. 1 the description thereof will not be repeated and the same reference numerals preceded by the digit "1" will be utilized to indicate the corresponding parts. In this form of the invention, two rectifiers 126 and 127 are employed. The negative element of rectifier 126 is connected by means of a conductor 48 to the terminal 121 of the secondary 119 of transformer 117. In a similar manner, the positive terminal of the rectifier 127 is connected by means of a conductor 49 with the terminal 122 of transformer 117. The positive terminal of rectifier 126 is connected by means of a conductor 51 to one end of a variable resistor 52. The other end of this resistor is connected by a conductor 53 to the negative terminal of the rectifier 127. The variable resistor 52 has a movable contact 54 which is connected by means of a conductor 55 to the rail 111 of the railway track. The other rail 112 is connected by means of a conductor 56 to the center tap 123 of the transformer. In addition, another circuit 57 is employed which includes a rectifier 58. The negative terminal of this rectifier is connected by means of a conductor 59 to the terminal 121 of transformer secondary 119. The positive terminal of this rectifier is connected by means of a conductor 61 to the rail 111.

The operation of this form of the invention is as follows: Alternating current is passed by the two rectifiers 58 and 126 to the rail 111 and is returned to the center tap 123 which is connected to rail 112. Unidirectional current is passed through the rectifier 127 and the conductor 55 to rail 111 and again returned from rail 112 through conductor 56 to the center tap 123. It will thus be seen that when the contact 54 is at the upper end of the resistor 52, that the voltage of the alternating current is the greatest. When, however, the contact 54 is at the lower end of the said resistor, the voltage of the unidirectional current is the greatest.

In Fig. 3 another form of the invention has been shown and in which the circuit reverses polarity so that the train can be run either backward or forward without switching. Due to the similarity of certain of the parts of this form of the invention with those shown in Fig. 1, the description of the same will not be repeated and the same reference numerals preceded by the digit "2" will be used to designate the coresponding parts. In this form of the invention the two rectifiers 226 and 227 are employed. The positive side of the rectifier 226 is connected by means of a conductor 62 to the terminal 221 of secondary 219 of transformer 217. In similar manner, the negative terminal of the rectifier 227 is connected by means of a conductor 63 to the terminal 221 of the secondary 119 of transformer 217. The other terminal of rectifier 226 is connected by means of a conductor 64 to one end of the variable resistor 232, and, similarly, the other terminal of rectifier 227 is connected by means of a conductor 65 to one end of the variable resistor 239. The movable contacts 235 and 243 of these resistors are connected together by means of a conductor 66 which in turn is connected to rail 211. Rail 212 is connected by means of a conductor 67 to the terminal 222 of the secondary 219 of transformer 217.

When the contacts 235 and 243 are in the middle of the two resistors 232 and 239, pure alternating current is produced and no unidirectional current flows. The motor of the train is then deenergized. However, full alternating current voltage for operating the light is secured. When the contacts are moved toward one end of the resistors 232 and 239, the voltage in one of said resistors is increased and the voltage at the other resistor is decreased so that either the positive or the negative pulses of the alternatnig current predominate and unidirectional current results. Whether or not the current is of plus or minus polarity depends upon the particular direction the contacts pass the midpoints of the resistors, and the voltage depends upon the distance away from midpoint. Since the alternating current remains the same at all times, the lights are maintained at the desired brilliancy, and the speed of the motor can be varied as desired.

In Fig. 4, still another form of the invention is disclosed, which is similar to that shown in Fig. 1 except that a single potentiometer is used instead of two. Due to the similarity of certain of the parts the description of the same will not be repeated and the same reference numerals preceded by the digit "3" will be used to designate the corresponding parts. In this form of the invention, resistor 39 is dispensed with, and conductor 337 leading from center tap 323 is connected to the rail 312. Also, conductor 344 connected to the terminal 322 of the secondary 319 is connected to the terminal 334 of resistor 332.

The operation of the form of the invention shown in Fig. 4 is as follows: When contact 335 is at the end terminal 334 of resistor 332 alternating current is directly applied to the rails 10 and 11. When contact 335 is at terminal 333 of said resistor full wave rectified current is transmitted to the rails.

Satisfactory results have been obtained with the invention shown in Fig. 4 with the use of components described as follows:

317—Transformer, primary 115 volts, 60 c.p.s., secondary 35 volts center tapped and rated at 1 ampere.
326 and 327—3 inch square selenium rectifiers rated at 1½ amperes, peak inverse voltage 36 volts, forward resistance at 1 volt approximately 1 ohm.
332—Variable resistor 40 ohms, 25 watts.
315—Type 1447 lamp, 16 volts .15 ampere.
347—Series choke, resistance 2.5 ohms, 120 milli-henrys or more.
314—Direct current motor drawing .3 ampere at 12 volts with no load.

The advantages of the invention are manifest. The device is extremely simple and operates to maintain the lights of the electric train substantially uniformly illuminated regardless of the speed of the train. At the same time, the speed of the train can be conrolled at the source of power by adjusting the rheostats and without appreciably affecting the brilliancy of the lights. The apparatus requires a minimum number of parts and can be fabricated at a nominal expense and can be used with existing trains without material change.

Changes in the specific form of the invention, as herein described, may be made within the scope of what is claimed without departing from the spirit of the invention.

Having described the invention, what is claimed as new and desired to be protected by Letters Patent is:

1. In a power supply for miniature electric railways having a two-rail track and a train with a direct current motor and an electric light, the combination of a power unit delivering unidirectional current to the rails and a power unit delivering alternating current to the rails and means for simultaneously raising the voltage of the alternating current as the voltage of the unidirectional current is lowered.

2. In a power supply for miniature electric railways having a two-rail track and a train with a unidirectional current motor and an electric light, the combination of a unidirectional current power unit delivering unidirectional current to the rails and an alternating current power unit delivering alternating current to the rails, a variable resistor connected in series with the unidirectional current power unit and the load, a second variable resistor connected in series with the alternating current power unit and the load and means for increasing the resistance of one of said resistors include between the unidirectional current power unit and the load while simultaneously decreasing the corresponding resistance of the other variable resistor.

3. In a power supply for miniature electric raliways having a two-rail track and a train with a unidirectional current motor and an electric light, the combination of a unidirectional current power unit and an alternating current power unit, a variable resistor connected across said unidirectional current power unit and having a variable tap, a second variable resistor connected across said alternating current power unit and having a variable tap, conductors connecting said taps to the rails and means for simultaneously moving said taps to increase the voltage of the unidirectional current across the rails while correspondingly decreasing the voltage of the alternating current across the rails.

4. In a power supply for miniature electric railways having a two-rail track and a train with a unidirectional current motor and an electric light, the combination of a power unit delivering unidirectional current to the rails and a power unit delivering alternating current to the rails, means for simultaneously raising the voltage of the alternating current as the voltage of the unidirectional current is lowered, and an inductance connected in series with said motor.

5. In a power supply for miniature electric railways having a two-rail track and a train with a unidirectional current motor and an electric light, the combination of a transformer having a primary winding and a secondary winding, the secondary winding having end terminals and an intermediate tap, a circuit including the end terminals of said secondary and two rectifiers disposed in opposition, a unidirectional current circuit connected to a point of said first named circuit between said rectifiers and to said intermediate tap and including the winding of a variable resistor having a movable contact, an alternating current circuit connected to said center tap and to one of the end terminals of the secondary winding and including the winding of a second variable resistor having a movable contact, and conductors connecting said contacts to said rails.

6. In a power supply for miniature electric railways having a two-rail track and a train with a unidirectional current motor and an electric light, the combination of a transformer having a primary winding and a secondary winding, the secondary winding having end terminals, a conductor connected to one of said end terminals and to one of the rails, a circuit connected to the other end terminal of the transformer and including a rectifier and a variable resistor, a second circuit connected to said second named end terminal and including a rectifier and a variable resistor, said second named rectifier being connected in reverse as compared to said first rectifier, a conductor connecting the movable contacts of the resistors together and to the other rail, and means for moving said movable contacts in a manner to increase the resistance of one of said resistors included in its circuit and to decrease the resistance of the other resistor included in its circuit.

7. In a power supply for miniature electric railways having a two-rail track and a train with a unidirectional current motor and an electric light, the combination of a transformer having a primary winding and a secondary winding, the secondary winding having end terminals, a conductor connected to one of said end terminals and to one of the rails, a rectifier and a variable resistor having a movable contact, a conductor connected to the other end terminal of said secondary and to a terminal of said rectifier having a certain polarity, another conductor connecting the other terminal of said rectifier with one end of said resistor, a second rectifier and a second variable resistor having a movable contact and disposed with its winding disposed in proximity to the winding of the first resistor and with its movable contact connected to and movable with the movable contact of said first resistor, a conductor connecting the second terminal of the secondary of said transformer to the terminal of said second rectifier of opposite polarity as compared to the terminal of the first rectifier connected to said secondary, a conductor connected to the other terminal of said second rectifier and to the end of the second resistor remote from the end of the first resistor connected to the first rectifier, and a conductor connecting the contacts of said resistors to the other rail.

8. In a power supply for miniature electric railways having a two-rail track and a train with a unidirectional current motor and an electric light, the combination of a transformer having a primary winding and a secondary winding, the secondary winding having end terminals and a center tap, a variable resistor having a movable contact and end terminals, a rectifier, a conductor connected to one end terminal of said secondary of said transformer and to the terminal of said rectifier of a certain polarity, a conductor connecting the other terminal of said rectifier to one end of said resistor, a second rectifier, a conductor connected to the other end terminal of said secondary and to the terminal of said second rectifier of opposite polarity as compared to the terminal of said first rectifier connected to said transformer, a conductor connected to the movable contact of said resistor and to one of said rails, a conductor connected to one end of said secondary and to the other rail, a third rectifier, a conductor connecting the first named terminal of said transformer to the terminal of said third rectifier having the same polarity as the terminal of said second rectifier connected to said transformer.

9. In a power supply for miniature electric railways having a two-rail track and a train with a unidirectional current motor and an electric light, the combination of a unidirectional current power unit delivering unidirectional current to the rails and an alternating current power unit delivering alternating current to the rails, a variable resistor having its ends connected to both the unidirectional current power unit and the alternating current power unit, said resistor having a movable contact controlling the voltage of both the unidirectional current and the alternating current fed to the rails and on movement in one direction increasing the voltage of one current while decreasing the voltage of the other current and vice versa.

10. In a power supply for miniature electric railways having a two-rail track and a train with a unidirectional current motor and an electric light, the combination of a transformer having a primary winding and a secondary winding, the secondary winding having end terminals and an intermediate tap, a circuit including the end terminals of said secondary and two rectifiers disposed in opposition, a unidirectional current circuit connected to a point of said first named circuit between said rectifiers and to said intermediate tap and including the winding of a variable resistor having a movable contact, an alternating current circuit connected to said intermediate tap and to one of the end terminals of the secondary winding, and conducting means connecting said circuits to said rails.

11. In a power supply for miniature electric railways having a two-rail track and a train with a unidirectional current motor and an electric light, the combination of a transformer having a primary winding and a secondary winding, the secondary winding having end terminals and an intermediate tap, a circuit including the end terminals of said secondary and two rectifiers disposed in opposition, a variable resistor having a movable contact, a conductor connecting one end of said resistor to a point between said rectifiers, a conductor connecting the other end of said resistor to one of the turns of said secondary, a conductor connecting the movable contact of said resistor to one rail, and an alternating current circuit connected to a turn of the secondary and to the other rail.

12. In a power supply for miniature electric railways having a two-rail track and a train with a unidirectional current motor and an electric light, the combination of a transformer having a primary winding and a secondary winding, the secondary winding having end terminals and an intermediate tap, a circuit including the end terminals of said secondary and two rectifiers disposed in opposition, a variable resistor having a movable contact, a conductor connecting one end of said resistor to a point between said rectifiers, a conductor connecting the other end of said resistor to one of the end terminals of the transformer, a conductor connecting the movable contact of said resistor to one of said rails, and conducting means connecting said intermediate tap to the other rail.

13. In a power supply for miniature electric railways having a two-rail track and a train with a unidirectional current motor and an electric light, the combination of a transformer having a primary winding and a secondary winding, the secondary winding having end terminals and an intermediate tap, a circuit including the end terminals of said secondary and two rectifiers disposed in opposition, a variable resistor having a movable contact, a conductor connecting one end of said resistor to a point between said rectifiers, a conductor connecting the other end of said resistor to one of the end terminals of the transformer, a conductor connecting the movable contact of said resistor to one of said rails, and a conductor connecting said intermediate tap to the other rail.

14. In a power supply for miniature electric railways having a two-rail track and a train with a direct current motor and an electric light, the combination of a power unit delivering unidirectional current to the rails and a power unit delivering alternating current to the rails, a circuit for said motor connected to said rails, an inductance in said circuit, impressing unidirectional voltage on said motor, means for varying the unidirectional voltage applied to the rails from substantially zero to maximum, and means for increasing the alternating voltage as the unidirectional voltage is lowered to produce at the rails a voltage for energizing the light when the motor is off approximately as great as when the motor is fully energized.

References Cited in the file of this patent
UNITED STATES PATENTS

| | | |
|---|---|---|
| 1,778,465 | Ozanne | Oct. 14, 1930 |
| 2,073,443 | Cardoza | Mar. 9, 1937 |
| 2,754,432 | Mostek | July 10, 1956 |